(12) United States Patent
Osentoski

(10) Patent No.: US 8,914,400 B2
(45) Date of Patent: Dec. 16, 2014

(54) ADJUSTING RESULTS BASED ON A DROP POINT

(75) Inventor: Dennis D. Osentoski, Highland Village, TX (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 13/109,820

(22) Filed: May 17, 2011

(65) Prior Publication Data

US 2012/0296917 A1    Nov. 22, 2012

(51) Int. Cl.
*G06F 17/30* (2006.01)

(52) U.S. Cl.
CPC .... *G06F 17/30654* (2013.01); *G06F 17/30693* (2013.01)
USPC ........... 707/768; 707/728; 707/730; 707/731; 707/758; 707/765; 707/766

(58) Field of Classification Search
CPC .................................. G06F 17/30; G06F 17/00
See application file for complete search history.

(56) References Cited

U.S. PATENT DOCUMENTS

| | | | | |
|---|---|---|---|---|
| 5,007,080 A | * | 4/1991 | MacMillan et al. | 379/269 |
| 5,761,672 A | * | 6/1998 | Samuelsson et al. | 1/1 |
| 5,940,837 A | * | 8/1999 | Samuelsson et al. | 1/1 |
| 5,941,947 A | * | 8/1999 | Brown et al. | 709/225 |
| 6,223,219 B1 | * | 4/2001 | Uniacke et al. | 709/223 |
| 6,405,313 B1 | * | 6/2002 | Reiter et al. | 713/156 |
| 6,614,784 B1 | * | 9/2003 | Glitho et al. | 370/352 |
| 6,822,945 B2 | * | 11/2004 | Petrovykh | 370/270 |
| 7,433,368 B2 | * | 10/2008 | Feith et al. | 370/466 |
| 7,523,130 B1 | * | 4/2009 | Meadway et al. | 1/1 |
| 7,586,859 B2 | * | 9/2009 | Petrovykh | 370/270 |
| 7,783,644 B1 | * | 8/2010 | Petrou et al. | 707/748 |
| 7,847,820 B2 | * | 12/2010 | Vallone et al. | 348/143 |
| 7,904,511 B2 | * | 3/2011 | Ryan et al. | 709/204 |
| 7,958,128 B2 | * | 6/2011 | Petrou et al. | 707/748 |
| 8,121,905 B2 | * | 2/2012 | Mohan | 705/26.7 |
| 2001/0025277 A1 | * | 9/2001 | Hyldahl | 707/1 |

(Continued)

FOREIGN PATENT DOCUMENTS

| | | |
|---|---|---|
| WO | 0051050 | 8/2000 |
| WO | 2009140296 | 11/2009 |

OTHER PUBLICATIONS

Borzsonyi, S., D. Kossmann, and K. Stocker, "The Skyline Operator", Proceedings of the 17th International Conference on Data Engineering, 2001, 20 pp. (Also available at URL: http://www.dbis.ethz.ch/research/publications/38.pdf.).

(Continued)

*Primary Examiner* — Farhan Syed
(74) *Attorney, Agent, or Firm* — Janaki K. Davda; Konrad, Raynes, Davda and Victor LLP

(57) ABSTRACT

Provided are techniques for providing entities. For a keyword, historical data is used to generate a list of entities, wherein a recommendation score is associated with each of the entities. The entities are ranked based on the recommendation score associated with each of the entities. A drop point that is associated with an entity whose recommendation score is low is determined. One or more additional entities are identified for at least one of the entities having a high recommendation score in the list. The one or more additional entities are inserted above the drop point in the list. The list is stored with the keyword.

24 Claims, 8 Drawing Sheets

| PRODUCT | RECOMMENDATION SCORE | NOTES |
|---|---|---|
| Spincast Reel | 973.291 | This was the most common product among all the sessions associated with search term 'Fishing Rods'. |
| Deep Sea Fishing Rod | 901.020 | Second most common product. |
| 7 foot Fishing Rod | 632.031 | |
| Spincast Reel and Rod Combination | 579.322 | |
| Seeker | 578.999 | Recommendation score has been altered. |
| Travel Mate | 578.998 | Recommendation score has been altered. |
| Worm Gear Fishing Rod Reel Combination | 578.997 | Recommendation score has been altered. |
| US Rod | 578.996 | Recommendation score has been altered. |
| UC Fishing 7 Foot Rod | 579.995 | Recommendation score has been altered. |
| Drop Point → Large Tackle Box | 187.311 | Note the drop in recommendation score relative to its predecessors. |
| Floater Fishing Lure | 67.203 | |
| Lure Walleye Kit | 21.211 | |

600

(56) References Cited

U.S. PATENT DOCUMENTS

| | | | |
|---|---|---|---|
| 2002/0035561 A1* | 3/2002 | Archer et al. | 707/6 |
| 2002/0099637 A1* | 7/2002 | Wilkinson et al. | 705/36 |
| 2003/0037113 A1* | 2/2003 | Petrovykh | 709/205 |
| 2004/0083191 A1* | 4/2004 | Ronnewinkel et al. | 706/20 |
| 2006/0121433 A1* | 6/2006 | Adams | 434/323 |
| 2006/0179045 A1* | 8/2006 | Grinsfelder et al. | 707/3 |
| 2007/0203906 A1* | 8/2007 | Cone et al. | 707/6 |
| 2008/0140514 A1* | 6/2008 | Stenger | 705/10 |
| 2008/0183704 A1* | 7/2008 | Miller et al. | 707/6 |
| 2008/0222105 A1* | 9/2008 | Matheny | 707/3 |
| 2008/0255977 A1* | 10/2008 | Altberg et al. | 705/35 |
| 2008/0270250 A1* | 10/2008 | Bolivar et al. | 705/26 |
| 2009/0138340 A1* | 5/2009 | Borr et al. | 705/11 |
| 2009/0182767 A1* | 7/2009 | Meadway et al. | 707/102 |
| 2009/0192983 A1* | 7/2009 | Elango | 707/3 |
| 2009/0193003 A1* | 7/2009 | Heymans et al. | 707/3 |
| 2009/0282019 A1* | 11/2009 | Galitsky et al. | 707/5 |
| 2010/0125599 A1* | 5/2010 | Cheng et al. | 707/771 |
| 2010/0274594 A1* | 10/2010 | Virdhagriswaran et al. | 705/4 |
| 2010/0281034 A1* | 11/2010 | Petrou et al. | 707/748 |
| 2010/0318422 A1 | 12/2010 | Kim et al. | |
| 2011/0137816 A1* | 6/2011 | Kornblum et al. | 705/321 |
| 2011/0153327 A1* | 6/2011 | Iasso | 704/243 |
| 2011/0153423 A1* | 6/2011 | Elvekrog et al. | 705/14.53 |
| 2011/0173175 A1* | 7/2011 | Cone et al. | 707/708 |
| 2011/0219011 A1* | 9/2011 | Carmel et al. | 707/749 |
| 2011/0246181 A1* | 10/2011 | Liang et al. | 704/9 |
| 2011/0276432 A1* | 11/2011 | Bolivar et al. | 705/26.61 |
| 2012/0036137 A1* | 2/2012 | Naidu et al. | 707/748 |
| 2012/0041818 A1* | 2/2012 | Symons et al. | 705/14.46 |
| 2012/0089617 A1* | 4/2012 | Frey | 707/748 |
| 2012/0095863 A1* | 4/2012 | Schiff et al. | 705/26.7 |
| 2012/0130976 A1* | 5/2012 | Cone et al. | 707/706 |

OTHER PUBLICATIONS

Guha, R., R. Mccool, and E. Miller, "Semantic Search", Proceedings of the 12th International Conference on World Wide Web, May 2003, 13 pp. (Also available at URL: http://wwww2003.org/cdrom/papers/refereed/p779/ess.html.).

Lee, J., S. Hwang, Z. Nie, and J. Wen, "Product EntityCube: A Recommendation and Navigation System for Product Search", Proceedings of the 26th IEEE International Conference on Data Engineering (ICDE), Mar. 2010, 4 pp. (Also available at URL: http://ids.postech.ac.kr/~swhwang/icde_demo.pdf.).

Ricci, F., N. Mirzadeh, and A. Venturini, "Intelligent Query Management in a Mediator Architecture", Proceedings of the 1st IEEE International Symposium on Intelligent Systems, 2002, 6 pp. (Also available at URL: http://www.inf.unibz.it/~ricci/papers/IS2002-Ricci-Mirzadeh-Venturini.pdf.).

Thomson Reuters, "Search—The Knowledge to Discover", [online], © 2011, [Retrieved on Apr. 5, 2011], Retrieved from the Internet at <URL: http://wokinfo.com/benefits/whywok/oursearchcapabilities/>, 7 pp.

Williams, B., "Extending Your Successful Website: Improve Your Search Engine", [online] Oct. 24, 2009, [Retrieved on Apr. 5, 2011], Retrieved from the Internet at <URL: http://www.devatwork.nl/2009/10/extending-your-successful-website-improve-your-search-engine/>, 3 pp.

* cited by examiner

| PRODUCT | RECOMMENDATION SCORE | NOTES |
|---|---|---|
| Spincast Reel | 973.291 | This was the most common product among all the sessions associated with search term 'Fishing Rods'. |
| Deep Sea Fishing Rod | 901.020 | Second most common product. |
| 7 foot Fishing Rod | 632.031 | |
| Spincast Reel and Rod Combination | 579.322 | |
| Large Tackle Box ← Drop Point | 187.311 | Note the drop in recommendation score relative to its predecessors. |
| Floater Fishing Lure | 67.203 | |
| Lure Walleye Kit | 21.211 | |

FIG. 4

| PRODUCT | RECOMMENDATION SCORE | NOTES |
|---|---|---|
| Seeker | 26010.221 | Top selling/viewed product in fishing category. |
| Travel Mate | 13976.327 | |
| Worm Gear Fishing Rod Reel Combination | 9076.333 | |
| US Rod | 2045.243 | |
| UC Fishing 7 Foot Rod | 987.211 | |

| PRODUCT | RECOMMENDATION SCORE | NOTES |
|---|---|---|
| Spincast Reel | 973.291 | This was the most common product among all the sessions associated with search term 'Fishing Rods'. |
| Deep Sea Fishing Rod | 901.020 | Second most common product. |
| 7 foot Fishing Rod | 632.031 | |
| Spincast Reel and Rod Combination | 579.322 | |
| Seeker | 578.999 | Recommendation score has been altered. |
| Travel Mate | 578.998 | Recommendation score has been altered. |
| Worm Gear Fishing Rod Reel Combination | 578.997 | Recommendation score has been altered. |
| US Rod | 578.996 | Recommendation score has been altered. |
| UC Fishing 7 Foot Rod | 579.995 | Recommendation score has been altered. |
| Large Tackle Box | 187.311 | Note the drop in recommendation score relative to its predecessors. |
| Floater Fishing Lure | 67.203 | |
| Lure Walleye Kit | 21.211 | |

Drop Point → (points to Large Tackle Box row)

FIG. 6

ADJUSTING RESULTS BASED ON A DROP POINT

BACKGROUND

Embodiments of the invention relate to determining a drop point in a list of results and adjusting the list of results based on the drop point. In particular, results may be removed from the list or added to the list based on the drop point.

Companies often host web sites on the World Wide Web ("WWW" or "web") to sell products. If a customer is interested in a first product, companies would like to recommend additional products for purchase by the customer.

Many web sites today employ three types of search:

1) Paid Search—in which keywords are purchased by a company hosting a web site, and customers who are performing searches are directed to the web site by external search engines.

2) Natural Search—in which customers find search engine links related to their search terms and click the links to be routed to the site.

3) Onsite Search—in which customers at a company's web site use the search facility of the web site and explore the various products returned for a search.

To generate relevant product recommendations that the customer might be interested in viewing and/or purchasing, a monitoring system collects historical data regarding what products were most viewed and/or purchased by other customers at this web site who used the same or similar search terms within the realm of any of the above three types of searches.

Some conventional systems consolidate certain search terms and control weighting of various types of search activities and product activities. Some conventional systems require analysis of the search term recommendations for their relevancy and manual selection of product recommendations to fill in where either:

1) the recommendations generated fall short of a desired number of recommendations; and/or 2) sub-standard recommendations need to be overridden with better manual selections.

Thus, there is a need for an improved technique for generating recommendations based on search terms.

SUMMARY

Provided are a method, computer program product, and system for providing entities. For a keyword, historical data is used to generate a list of entities, wherein a recommendation score is associated with each of the entities. The entities are ranked based on the recommendation score associated with each of the entities. A drop point that is associated with an entity whose recommendation score is low is determined. One or more additional entities are identified for at least one of the entities having a high recommendation score in the list. The one or more additional entities are inserted above the drop point in the list. The list is stored with the keyword.

BRIEF DESCRIPTION OF THE SEVERAL VIEWS OF THE DRAWINGS

Referring now to the drawings in which like reference numbers represent corresponding parts throughout:

FIG. 4 illustrates a table of sample ranking of entities.

FIG. 5 illustrates table of additional relevant products in accordance with certain embodiments.

FIG. 6 illustrates a table with the additional products inserted into a table in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
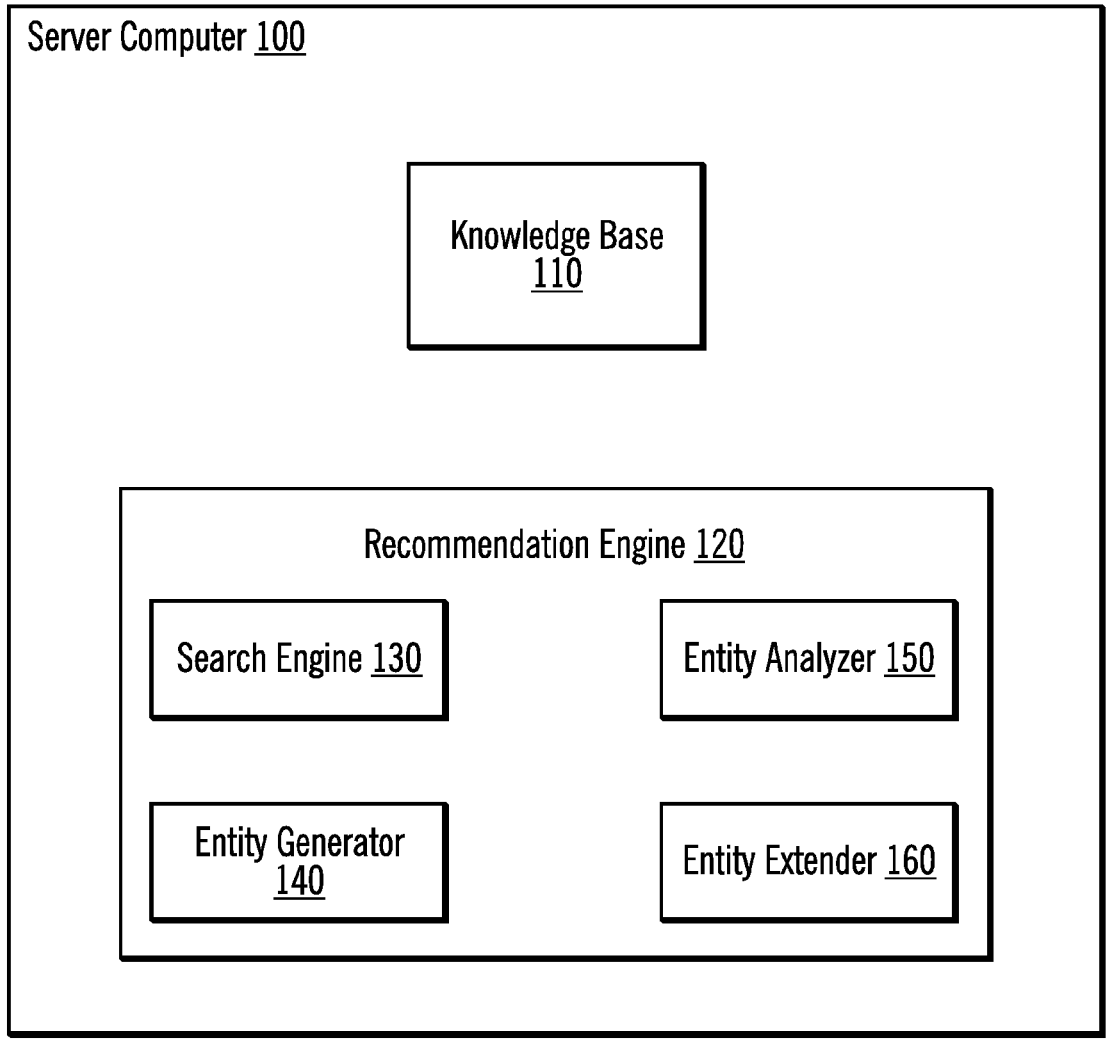
FIG. 1 illustrates, in a block diagram, a computing architecture for use in generating entity recommendations in accordance with certain embodiments.

FIG. 1 illustrates, in a block diagram, a computing architecture for use in generating entity recommendations in accordance with certain embodiments. A server computer 100 includes a knowledge base 110 and a recommendation engine 120.

The knowledge base 110 associates entities with keywords and keyword phrases (where a keyword phrase is comprised of one or more keywords). An entity may be a product (e.g., a fishing rod), articles, content, etc. Also, the knowledge base 110 may include historical data of previous viewers and purchasers of entities. For each entity, the historical data may include, for example, information on: 1) the types of searches performed when an entity was viewed or purchased, 2) the keywords and/or keyword phrases used in the search requests for the entity, 3) how many times the entity was viewed or purchased, 4) the dates that the activities (of viewing and purchasing) were performed, 5) how many times the entity was abandoned (i.e., added to a shopping cart and removed from the shopping cart, etc.). The knowledge base 110 may also store attributes of entities.

In certain embodiments, recommendation scores are generated as needed. In certain embodiments recommendation scores are stored in the knowledge base 110 for each entity. In certain embodiments, the recommendation scores represent an entity's relative association to a search.

The recommendation engine 120 locates relevant additional entities given a first entity. The recommendation engine 120 includes a search engine 130, an entity generator 140, an entity analyzer 150, and an entity extender 160.

Merely to enhance understanding, an example is provided in which the entity is a product (e.g., a fishing rod). The search engine 130 uses historical data in the knowledge base 110 to locate identify common keywords and/or keyword phrases associated with previous searches (e.g., by viewers or purchasers). Then, for a particular keyword (e.g., "fishing") or keyword phrase (e.g., "fishing rod"), the search engine 130 identifies relevant products for the keyword or for the keyword phrase. The entity generator 140 creates an initial list of products by ordering the relevant products based on the recommendation score of the associations between the products and the keyword or keyword phrase. The entity analyzer 150 may remove products from the list by locating a significant reduction in the recommendation score between two adjacent, ranked products and then, optionally, removing the second product and products that occur after the second product in the list to form a pruned entity. The entity extender 160 locates additional relevant products (e.g., if an insufficient number of relevant products exist in the pruned entity) by using key product attributes associated with the most relevant product to perform an additional search of the knowledge base, using a product relationship analysis technique (which is described with reference to FIG. 3) to order the relevant additional products. The additional relevant products are merged (inserted or injected) into the list to form a final list. Then, the recommendation engine 120 stores the final list in the knowledge base by associating the final list with the keyword or keyword phrase for which the processing was started (e.g., "fishing" or "fishing rod").

Figure 2:
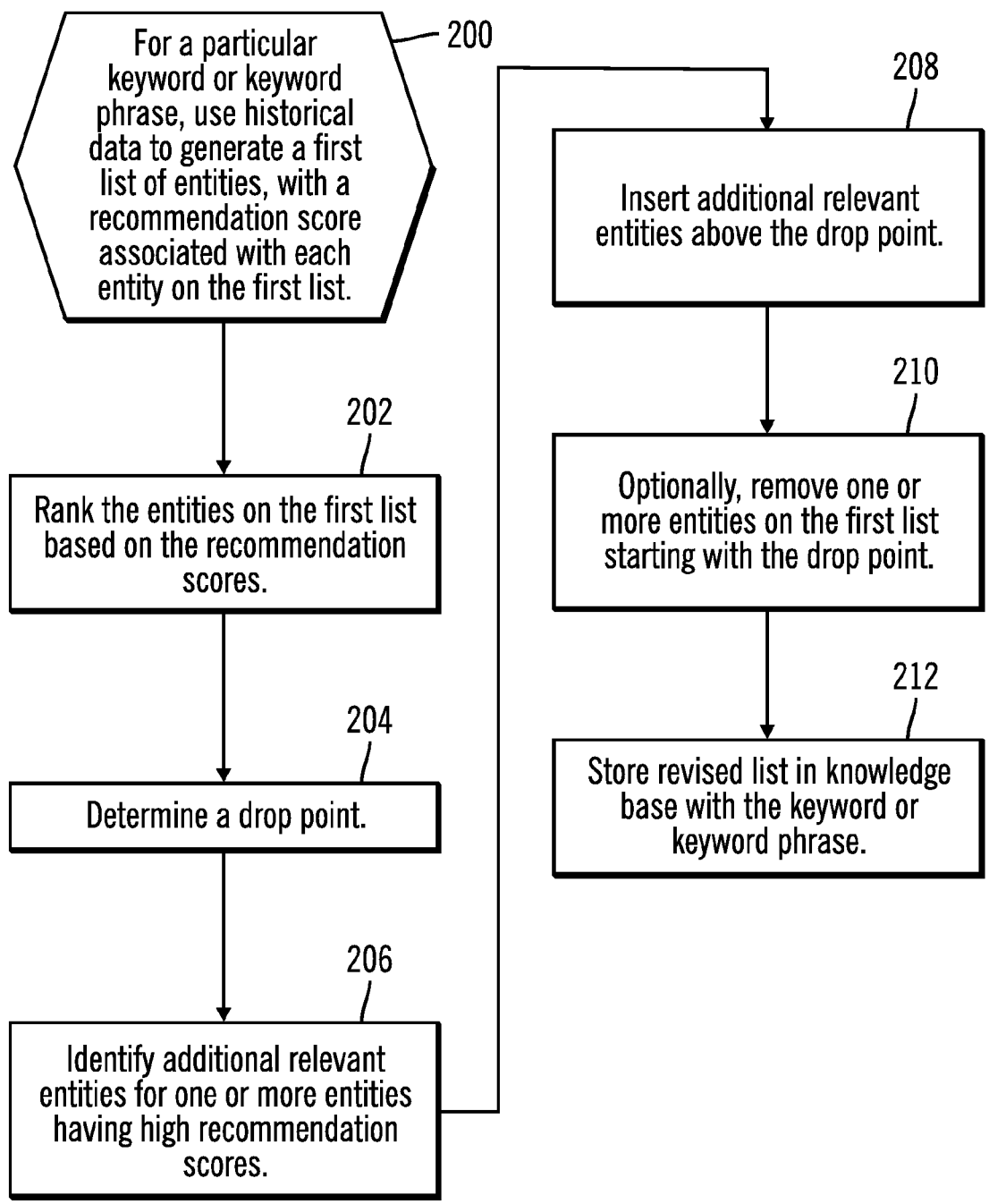
FIG. 2 illustrates, in a flow diagram, logic for determining entity recommendations in accordance with certain embodiments.

FIG. 2 illustrates, in a flow diagram, logic for determining entity recommendations in accordance with certain embodiments. In certain embodiments, the recommendation engine 120 pre-processes all the keywords that have been used for a historical period and applies the logic of FIG. 2 to generate the final results. Then, the recommendation engine 120 stores the results in the knowledge base 110 so that when an entity is identified (e.g., a search is performed using keywords), the recommendation engine 120 takes those keywords and looks them up in the knowledge base 110 to get the pre-calculated final results. The search terms in the search request may also be referred to as keywords. Keywords and keyword phrases are associated with entities (e.g., products) in the knowledge base 110.

For a particular keyword or keyword phrase, control begins in block 200 with the search engine 130 using historical data to generate a first list of entities, with a recommendation score associated with each entity on the first list. In certain embodiments, there is a list for each distinct keyword and keyword phrase that was used in the historical period. In certain embodiments, the search engine 130 first analyzes the historical web session data of sessions that were associated with one or more search terms originating from any of the three types of search by examining specific product activity in these sessions. In certain embodiments, the entities are products that may be recommended for purchase. In certain embodiments, the knowledge base 110 stores the historical data, and the search engine 130 searches the knowledge base 110 to locate relevant products for keywords based on the historical data. In certain embodiments, the entity generator 140 generates the recommendation scores by weighting the types of search and the product activities (e.g., viewing or purchasing).

In alternative embodiments, the entities may be topics or other items. Certain embodiments are directed to content based systems in which articles are stored. So, for someone searching on law school entrance requirements', the recommendation engine 120 may provide a series of articles, all determined by the same analysis described herein. In such embodiments, the recommendation engine 120 analyzes views of other articles associated with a search term.

In block 202, the entity generator 140 ranks the entities on the first list based on the associated scores. Thus, the entity generator 140 creates an initial list of entities by ordering relevant products based on the recommendation score of the associations between the products and the keywords. That is, the entity generator 140 generates scores for each recommendation of a search term that indicates the affinity (strength/weakness) of the product to the search term.

In block 204, the entity analyzer 150 determines a drop point. In certain embodiments, the entity analyzer 150 identifies a percentage drop in the recommendation scores of a first entity and a second entity in one or a combination of the following forms, depending on the configuration settings, and the second entity is designated as being associated with the drop point:

a) If a recommendation score of an entity falls below a percentage of the highest recommendation score, then identify that entity as the drop point.

b) If a recommendation score of an entity falls below a minimum value, then identify that entity as the drop point. This form works well in situations in which the first list of entities is short.

c) If a recommendation score of an entity drops a certain percentage from a recommendation score of an immediate, preceding entity, then identify that entity as the drop point. In such embodiments, the drop point is a point at which a significant (i.e., large) drop in the recommendation scores occurs between a first entity and a second entity in the first list. In certain embodiments, the entity analyzer 150 locates a significant reduction in the recommendation scores between the two entities.

d) If a recommendation score of an entity falls below a minimum percentage of the average of the recommendation scores of predecessors, then identify that entity as the drop point.

In certain embodiments, the second entity is associated with the drop point.

For the forms (a, b, c, d), in certain embodiments, the additional recommendations will be injected at this drop point. Optionally, in certain embodiments, entities with the recommendation score of the drop point and lower recommendation scores are removed from the first list. For example, if there are not a predetermined number of entities after secondary injections, the recommendation engine 120 may keep the entities below the drop point, and, if there are the predetermined number of entities after the secondary injections, the recommendation 120 engine will drop the entities at and below the drop point.

The configuration settings may be set by a system administrator or other user to indicate with one or combination of the three forms to use to determine the drop point.

Figure 3:
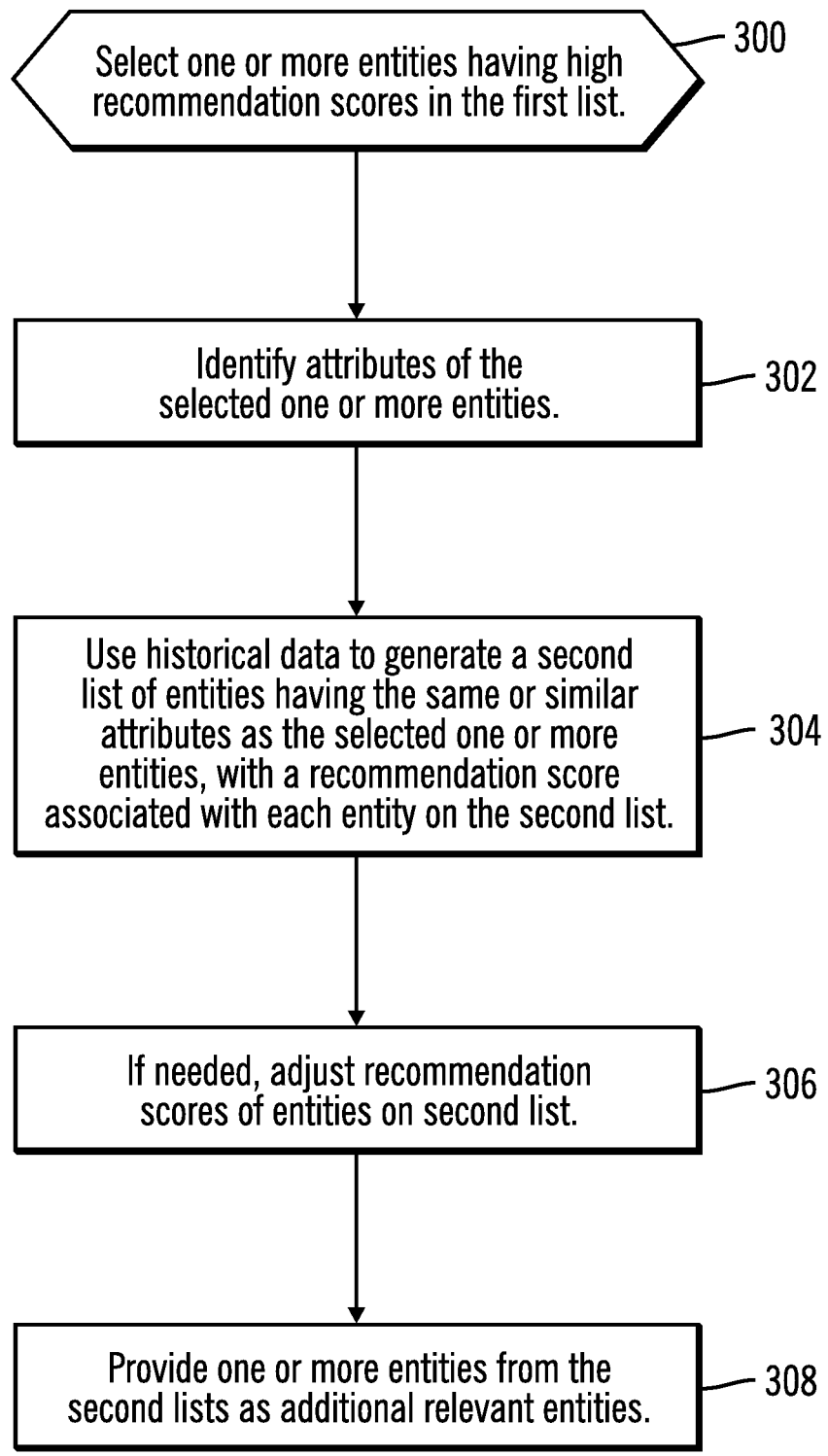
FIG. 3 illustrates, in a flow diagram, logic for identifying additional entities in accordance with certain embodiments.

In block 206, the entity extender 160 identifies additional relevant entities (i.e., secondary recommendations) for one or more entities having high recommendation scores. The processing for this is illustrated in FIG. 3. For example, the recommendation system 120 obtains the secondary recommendations based on the highest scoring products in the result set by finding products with matching attributes and ranking those products by overall score, irrespective of any search terms.

In block 208, the entity extender 160 inserts additional relevant entities above (i.e., before) the drop point (i.e., above the second entity associated with the drop point). Prior to the insertion, the entity extender 160 modifies the recommendation scores of the additional relevant products so that they may be inserted before the drop point, but after products already in the first list that are above the drop point.

In block 210, optionally, the entity analyzer 150 removes one or more entities on the first list starting with the drop point (i.e., starting with the second entity associated with the drop point through the end of the first list).

In block 212, the search engine 130 stores a revised list in the knowledge base 110 with the keyword or keyword phrase for which the processing of FIG. 2 was performed. The revised list may be described as the first list that has been revised with additions and/or deletions of entities.

FIG. 3 illustrates, in a flow diagram, logic for identifying additional entities in accordance with certain embodiments. Control begins at block 300 with selection of one or more entities having high recommendation scores in the first list. In block 302, the entity extender 140 identifies attributes of the selected one or more entities. In certain embodiments, the entity extender 160 examines one or more configured attributes of the entity with the highest recommendation score. The attributes may be configured by the system administrator or other user. In certain embodiments, the attributes may be configured to be the "Category" of a product (e.g., Sports Equipment, Mens' Shoes, etc.), but could also be configured to be another attribute (e.g., Brand).

In block 304, the entity extender 140 uses historical data to generate a second list of entities having the same or similar attributes as the selected one or more entities, with a recommendation score associated with each entity on the second list. The entity with the highest recommendation score may be referred to as a "primary" (highest affinity) recommendation. When the entities are products, the entity extender 160 may generate the second list using the same historical web session data to identify the top selling (or viewing) products on the customer's web site with the same or similar attributes as the product with the highest recommendation score on the first list.

In block 306, the entity extender 160, if needed, adjusts recommendation scores of entities on second list. In particular, the recommendation scores are adjusted so that they fall between the recommendation score of the entity preceding and adjacent to the entity associated with the drop point and the recommendation score of the entity associated with the drop point.

In block 308, the entity extender 160 provides one or more entities from the second list as additional relevant entities. Once these additional entities are identified, the additional entities may be injected into the first search list as appropriate recommendations for the search term (block 208).

Thus, in certain embodiments, the entity extender 140 examines historical purchase/viewing activity (disregarding search data) and determines the top-ranked selling/viewing entities that have matching attributes to the top search-based recommendation (i.e. same Category and/or brand, etc.). The entity extender further ensures that the top ranked entities are not already in the entities above the drop point. The entity extender 140 then injects these top ranked entities just above the drop point.

In certain embodiments, the recommendation engine 120 analyzes the first list of entities and their associated recommendation scores by iterating from a strongest to a weakest recommendation score, looking for a most substantial percentage drop within the first list. In certain embodiments, if this drop is identified within a desired number of entities, the recommendation engine 120 attempts to identify additional entities.

Merely to enhance understanding, an example will be provided herein with reference to providing product recommendations. Initially, the search engine 130 examines product browsing and purchase session activity for a web site over a configured number of days. The entity generator 140 identifies search terms associated with these sessions and ranks the activity associated with common terms by popularity. The determination of popularity is internally configurable and may take into consideration several factors in determining rank:

i. Purchasing activity versus browsing activity and the respective weighting applied to each; and ii. Recent activity versus older activity (i.e., weighting applied to more recent activity versus older activity).

For example, the recommendation engine 120 examines the purchase activity and browse activity for the web site for the last 60 days and identifies a common search term of 'Fishing Rods'. The recommendation engine 120 analyzes and processes the product purchasing and browsing data in sessions associated with the search term 'Fishing Rods' to identify products and assign recommendation scores. FIG. 4 illustrates a table 400 of sample ranking of products in accordance with certain embodiments. In FIG. 4, there is a column for products, a column for recommendation scores, and a column for notes provided merely to enhance understanding of embodiments. In certain embodiments, the notes column is optional.

The recommendation engine 120 examines the products of FIG. 4 using the recommendation scores. In the analysis, the recommendation engine 120 determines that the percentage drop between product 4 (Spincast Reel and Rod Combination) and product 5 (Large Tackle Box) exceeds a threshold used to determine continued relevancy. Thus, product 5 is determined to be a drop point. This may be based on one or more of the following factors:

a) a minimum percentage the recommendation score is of the highest scoring product
i.e., 187.311 versus 973.291
b) whether the recommendation score is below a minimum value
i.e., 187.311 versus 200.000 (a preset minimum value)
c) a minimum percentage the recommendation score is of its immediate predecessor
i.e., 187.311 versus 579.322
d) a min percentage the recommendation score is of the average of all its predecessors
i.e., 187.311 versus ((973.291+901.020+632.031+579.322)/4)

At this point, the recommendation engine 120 determines that additional product recommendations are to be injected between product 4 and product 5. The recommendation engine 120 identifies a starting base to identify the additional products. In this case, the product attributes of the top recommended product (Spincast Reel) is examined. The attributes can include, but are not limited to:

Category of the product (i.e., Fishing)
Brand of the product (i.e., company that makes the product)

Based on these attributes, the recommendation engine 120 identifies and ranks top sellers of all products on the web site by examining purchases and views. FIG. 5 illustrates table 500 of additional relevant products in accordance with certain embodiments.

Next, the recommendation engine 120 starts the injection process. Initially, the recommendation engine 120 modifies the recommendation scores of the additional relevant products so that they may be inserted before the drop point, but after products already in table 400 that are above the drop point. FIG. 6 illustrates a table 600 with the additional products (from table 500 of FIG. 5) inserted into the table 400 (of FIG. 4) in accordance with certain embodiments. In table 400, product 5 (Large Tackle Box) is the drop point. The products of table 500 are inserted into table 400 between product 4 and product 5 of table 400 to form table 600 (i.e., inserted before the drop point). In table 600, the products at and below the drop point are retained. In certain embodiments, the products at and below the drop point may be deleted from table 600. In certain embodiments, the products at and below the drop point are retained in table 600, but are not provided as entities in response to a search request.

Figure 7:
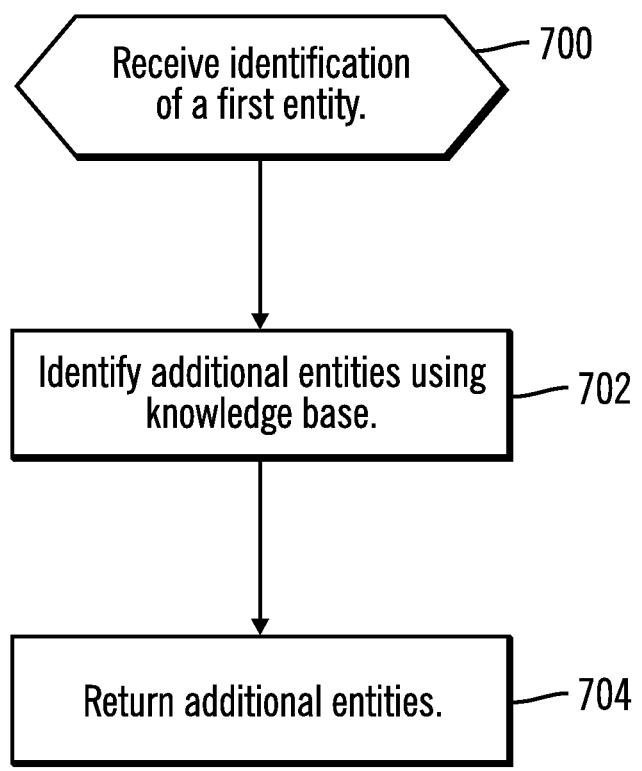
FIG. 7 illustrates, in a flow diagram, logic for providing additional entities in response to identification of a first entity in accordance with certain embodiments.

FIG. 7 illustrates, in a flow diagram, logic for providing additional entities in response to identification of a first entity in accordance with certain embodiments. Control begins at block 700 with the recommendation engine 120 receiving identification of a first entity. The first entity is associated with one or more keywords and/or keyword phrases. In certain embodiments, the first entity may be identified by a user who inputs a search request (e.g., user searches for "7 foot fishing rod") or may be identified by a user viewing or purchasing an entity (e.g., a user views or purchases a particular fishing rod). In block 702, the search result extender 160 identifies additional entities using the knowledge base 110. In particular, the knowledge base 110 associates keywords (e.g., "fishing" or "rod") and keyword phrases (e.g., "fishing rod") with additional relevant entities, and the search extender 160 identifies the additional relevant entities by searching for the keywords and/or keyword phrases associated with the identified first entity. In block 704, the search result extender 160 returns the additional entities (e.g., these are displayed for a user on a display screen of an output device).

Thus, the recommendation engine 120 provides an automated alternative to the manual and/or tedious effort required to eliminate the substandard recommendations that occur in conventional systems. The recommendation engine 120 analyzes entities for a first list of recommendations and determines the point at which the recommendation quality begins to fall at a rate that indicates relevancy has deteriorated to the point that the recommendation is substandard when compared to those recommendations that precede the recommendation. Then, the recommendation engine 120 examines certain attributes of the first recommendation on the first list (which may be referred to as a primary and/or most relevant recommendation for the search term), and then the recommendation engine 120 retrieves the best selling products that exhibit the same or similar attributes of that first recommendation. The recommendation engine 120 may be used by, for example, a marketing department. The recommendation engine 120 provides a list of product recommendations to the user that has a best potential for increasing not only their viewing activity on the web site, but also with possible increased purchasing activity.

The recommendation engine 120 uses a significant relative reduction in recommendation scores to determine when to drop entities. The recommendation engine 120 also performs another search using characteristics of the first (most relevant) entity.

For example, lesser used search terms often exhibit only one or two popular and/or relevant products, but then the relevancy may fall off extremely fast due to a lack of historical data. Embodiments are able to identify the disparity in the relevance of the products and provide additional recommendations.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

The recommendation engine 120 includes a search engine 130, an entity generator 140, an entity analyzer 150, and an entity extender 160, each of which may be implemented as hardware (e.g., hardware logic or circuitry), software, or a combination of hardware and software.

Figure 8:
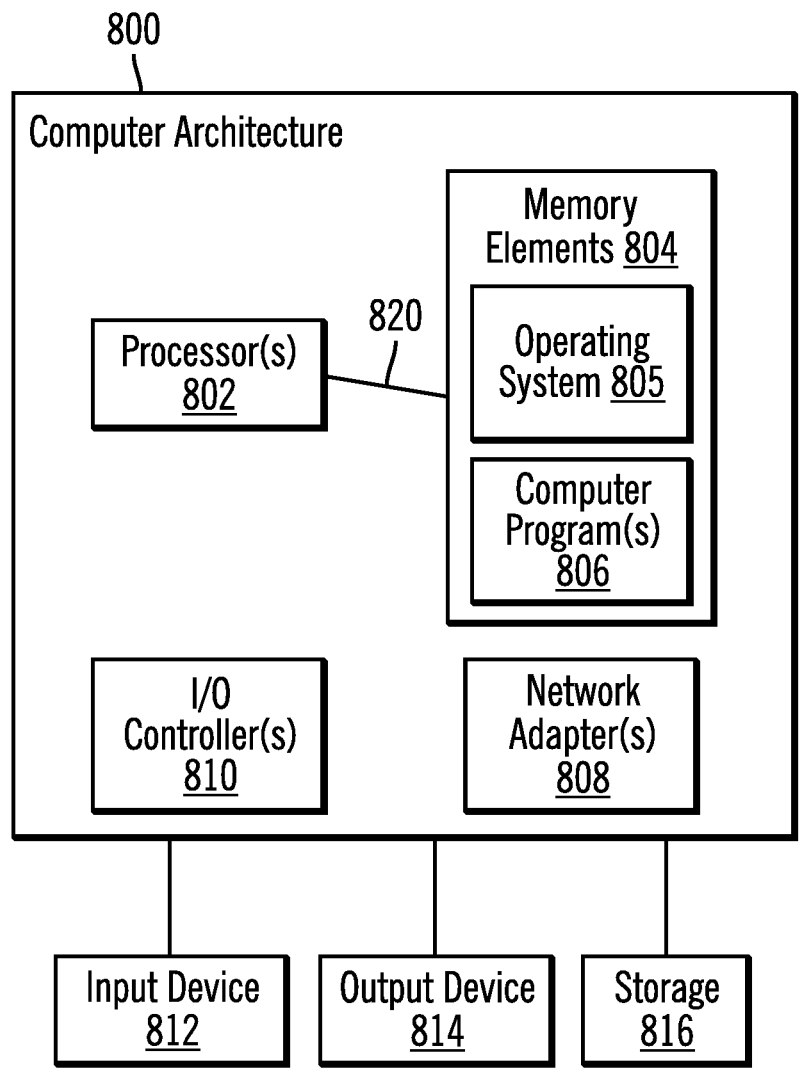
FIG. 8 illustrates, in a block diagram, a computer architecture that may be used in accordance with certain embodiments.

FIG. 8 illustrates a computer architecture 800 that may be used in accordance with certain embodiments. Server computer 100 may implement computer architecture 800. The computer architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The computer architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The computer architecture 800 may include fewer components than illustrated, additional components not illustrated herein, or some combination of the components illustrated and additional components. The computer architecture 800 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A computer-implemented method, with a processor coupled to memory, for providing entities, the method comprising:
    ranking, by the processor, entities in a first list of entities based on a recommendation score associated with each of the entities in the first list of entities;
    determining a drop point in the first list of entities by identifying a percentage drop that exceeds a threshold used to determine continued relevancy in the recommendation score of a first entity in the first list of entities and the recommendation score of a second entity in the first list of entities, wherein the drop point identifies the second entity as a point in the first list of entities above which a second list of entities are to be added;
    selecting an entity in the first list of entities that has a high recommendation score;
    using the historical data to generate the second list of entities having associated recommendation scores;
    adjusting a recommendation score associated with each of the entities in the second list of entities to fall between the recommendation score of the first entity and the recommendation score of the second entity;
    inserting entities from the second list of entities between the first entity and the second entity in the first list of entities based on the adjusted recommendation score associated with each of the entities in the second list of entities; and
    storing the first list of entities with the keyword.

2. The method of claim 1, wherein determining the drop point further comprises:
    determining that the recommendation score of the second entity falls below a percentage of a highest recommendation score.

3. The method of claim 1, wherein determining the drop point further comprises:
    determining that the recommendation score of the second entity falls below a minimum value.

4. The method of claim 1, wherein the first entity is an immediate, preceding entity relative to the second entity.

5. The method of claim 1, wherein determining the drop point further comprises:
    determining that the recommendation score of the second entity falls below a minimum percentage of an average of recommendation scores of predecessor entities.

6. The method of claim 1, wherein the selected entity in the first list of entities has a highest recommendation score.

7. The method of claim 1, further comprising:
    removing the entities on the first list of entities based on the drop point by removing the second entity through an entity that is at an end of the first list of entities.

8. The method of claim 1, further comprising:
    receiving identification of a third entity, wherein the keyword is associated with the third entity; and
    in response to receiving the identification, identifying one or more additional entities based on the first list of entities stored with the keyword.

9. A system for providing entities, comprising:
    a processor; and
    storage coupled to the processor, wherein the storage stores a computer program, and wherein the processor executes the computer program to perform operations, the operations comprising:
        ranking entities in a first list of entities based on a recommendation score associated with each of the entities in the first list of entities;
        determining a drop point in the first list of entities by identifying a percentage drop that exceeds a threshold used to determine continued relevancy in the recommendation score of a first entity in the first list of entities and the recommendation score of a second entity in the first list of entities, wherein the drop point identifies the second entity as a point in the first list of entities above which a second list of entities are to be added;
        selecting an entity in the first list of entities that has a high recommendation score;
        using the historical data to generate the second list of entities having associated recommendation scores;
        adjusting a recommendation score associated with each of the entities in the second list of entities to fall between the recommendation score of the first entity and the recommendation score of the second entity;
        inserting entities from the second list of entities between the first entity and the second entity in the first list of entities based on the adjusted recommendation score associated with each of the entities in the second list of entities; and
        storing the first list of entities with the keyword.

10. The system of claim 9, wherein the operations for determining the drop point further comprise:
    determining that the recommendation score of the second entity falls below a percentage of a highest recommendation score.

11. The system of claim 9, wherein the operations for determining the drop point further comprise:
    determining that the recommendation score of the second entity falls below a minimum value.

12. The system of claim 9, wherein the first entity is an immediate, preceding entity relative to the second entity.

13. The system of claim 9, wherein the operations for determining the drop point further comprise:
    determining that the recommendation score of the second entity falls below a minimum percentage of an average of recommendation scores of predecessor entities.

14. The system of claim 9, wherein the selected entity in the first list of entities has a highest recommendation score.

15. The system of claim 9, wherein the operations further comprise:
    removing the entities on the first list of entities based on the drop point by removing the second entity associated through an entity that is at an end of the first list of entities.

16. A computer program product for providing entities, the computer program product comprising:
    a computer readable storage medium having computer readable program code embodied therewith, the computer readable program code comprising:
    computer readable program code, when executed by a processor of a computer, configured to perform:
        ranking entities in a first list of entities based on a recommendation score associated with each of the entities in the first list of entities;
        determining a drop point in the first list of entities by identifying a percentage drop that exceeds a threshold used to determine continued relevancy in the recommendation score of a first entity in the first list of entities and the recommendation score of a second entity in the first list of entities, wherein the drop point identifies the second entity as a point in the first list of entities above which a second list of entities are to be added;
        selecting an entity in the first list of entities that has a high recommendation score;

using the historical data to generate the second list of entities having associated recommendation scores;

adjusting a recommendation score associated with each of the entities in the second list of entities to fall between the recommendation score of the first entity and the recommendation score of the second entity;

inserting entities from the second list of entities between the first entity and the second entity in the first list of entities based on the adjusted recommendation score associated with each of the entities in the second list of entities; and storing the first list of entities with the keyword.

17. The computer program product of claim 16, wherein, for determining the drop point, the computer readable program code, when executed by the processor of the computer, is configured to perform:
determining that the recommendation score of the second entity falls below a percentage of a highest recommendation score.

18. The computer program product of claim 16, wherein, for determining the drop point, the computer readable program code, when executed by the processor of the computer, is configured to perform:
determining that the recommendation score of the second entity falls below a minimum value.

19. The computer program product of claim 16, wherein the first entity is an immediate, preceding entity relative to the second entity.

20. The computer program product of claim 16, wherein, for determining the drop point, the computer readable program code, when executed by the processor of the computer, is configured to perform:
determining that the recommendation score of the second entity falls below a minimum percentage of an average of recommendation scores of predecessor entities.

21. The computer program product of claim 16, wherein the selected entity in the first list of entities has a highest recommendation score.

22. The computer program product of claim 16, wherein the computer readable program code, when executed by the processor of the computer, is configured to perform:
removing the entities on the first list of entities based on the drop point by removing the second entity through an entity that is at an end of the first list of entities.

23. The computer program product of claim 16, wherein the computer readable program code, when executed by the processor of the computer, is configured to perform:
receiving identification of a third entity, wherein the keyword is associated with the third entity; and in response to receiving the identification, identifying one or more additional entities based on the first list of entities stored with the keyword.

24. The system of claim 9, wherein the operations further comprise:
receiving identification of a third entity, wherein the keyword is associated with the third entity; and in response to receiving the identification, identifying one or more additional entities based on the first list of entities stored with the keyword.

* * * * *